July 29, 1969      F. H. TENNIS      3,457,842
PISTON AND ROD ASSEMBLY
Filed Oct. 17, 1967      3 Sheets-Sheet 1
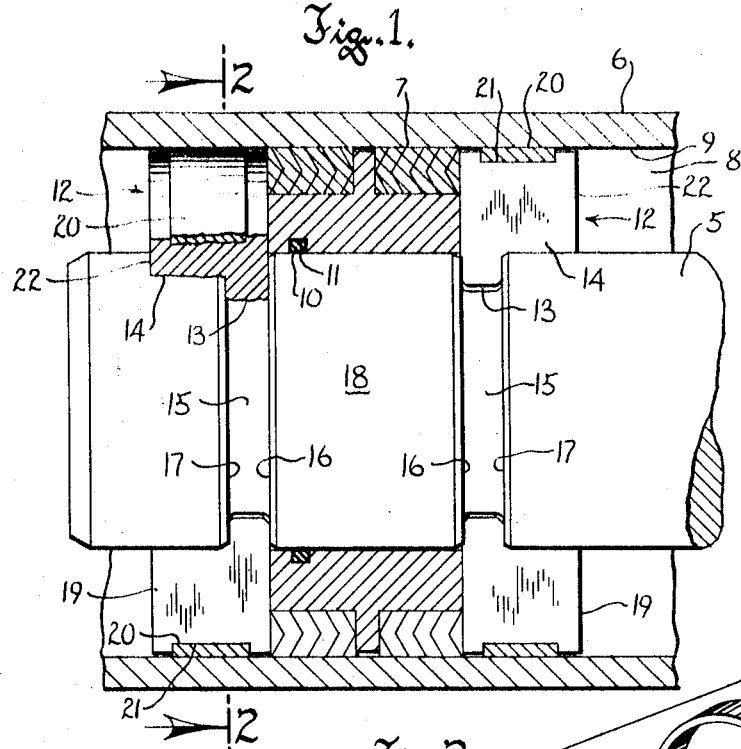
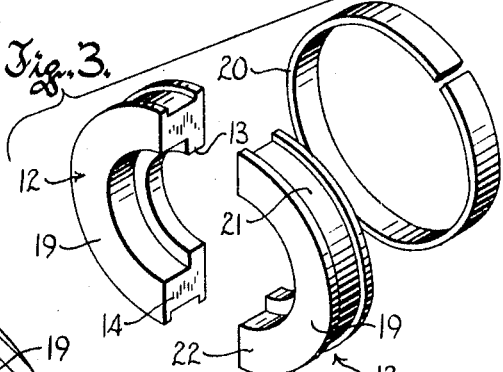
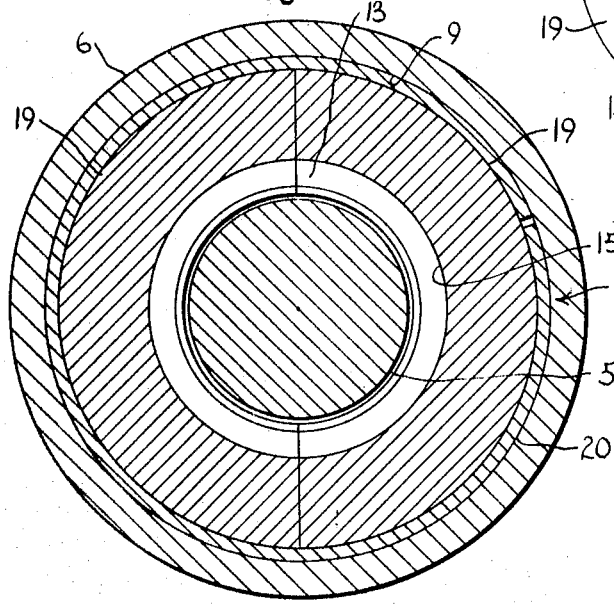
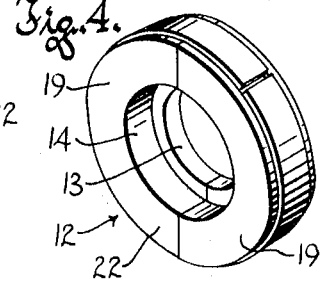
Francis H. Tennis

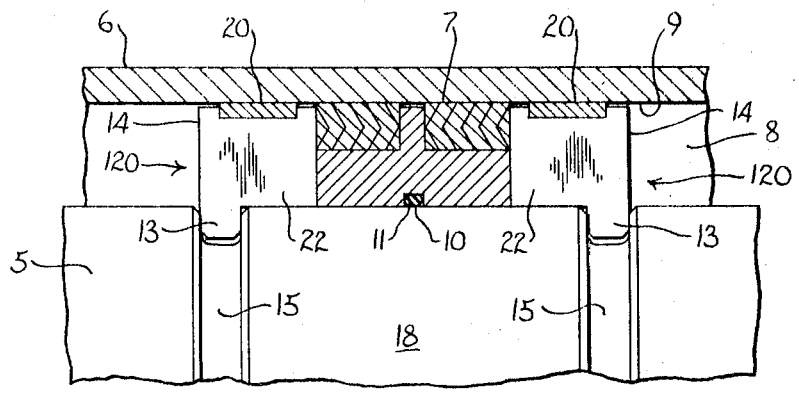
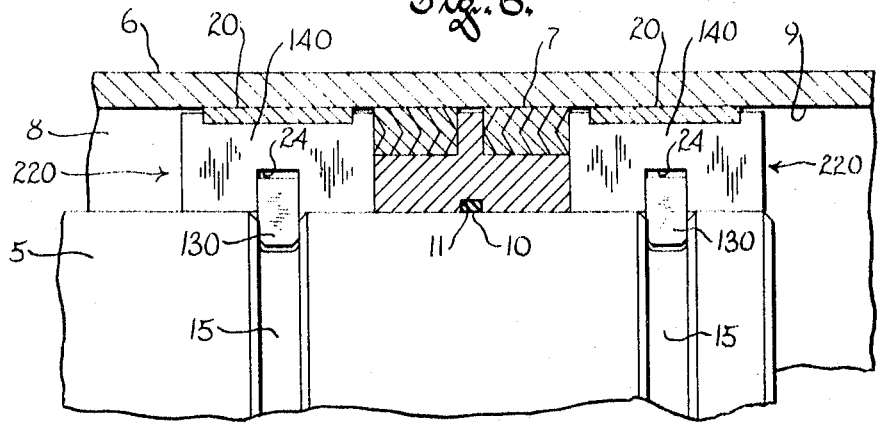

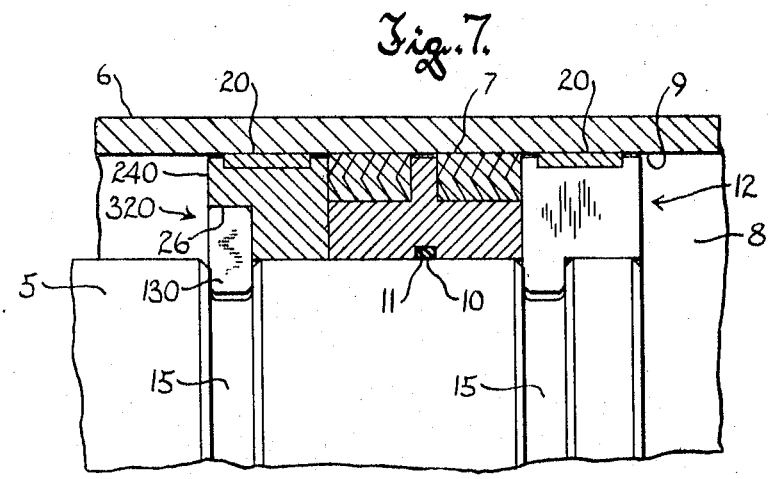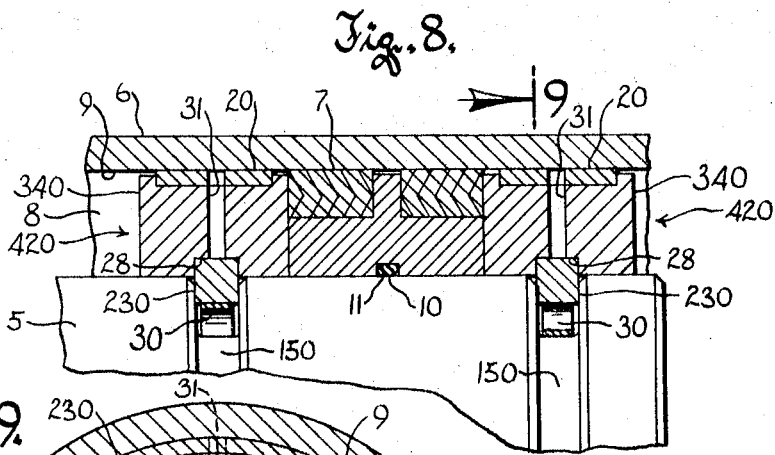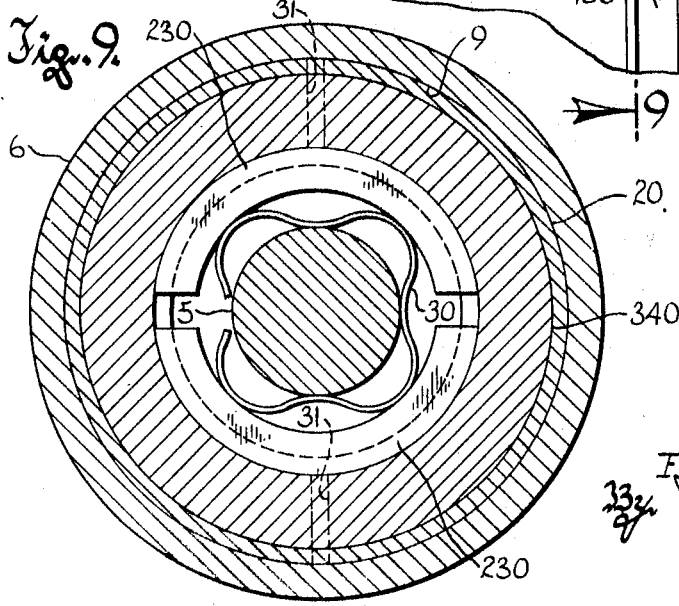

United States Patent Office 3,457,842
Patented July 29, 1969

3,457,842
PISTON AND ROD ASSEMBLY
Francis H. Tennis, Oconomowoc, Wis., assignor, by mesne assignments, to Koehring Company, Milwaukee, Wis., a corporation of Wisconsin
Filed Oct. 17, 1967, Ser. No. 675,884
Int. Cl. F16j 1/12
U.S. Cl. 92—200                                                7 Claims

ABSTRACT OF THE DISCLOSURE

An annular piston is held assembled on a piston rod by confinement of the piston endwise between pairs of ring like thrust receiving retainers. Each such retainer comprises circumferentially interrupted portions engaging in but laterally displaceable from grooves in the rod. Outer retainer portions connected with the inner portions normally hold the same against lateral displacement from the rod.

---

In a specific sense, this invention relates to hydraulic cylinders and more particularly to improvements in the piston and rod assemblies used in such cylinders. However, the invention is in no way limited to hydraulic cylinders, but can have utility in cylinders intended for other than hydraulic service.

In general, it is a purpose of this invention to provide a piston and rod assembly by which the piston can be fixed at any desired axial location on the rod entirely without screw threaded fastening means.

More particularly, it is a purpose of this invention to provide a piston and rod assembly for a cylinder, wherein the piston is held in place on the rod by means comprising a pair of split rings at each axial end of the piston, which split rings, in turn, can be held against lateral displacement from grooves in the rod by the wall of the cylinder in which the piston and rod assembly is installed.

Hence, it will be seen that the primary object of the invention resides in the provision of an improved self securing piston and piston rod assembly which is exceptionally simple to construct, and which can be assembled without the use of tools or screw threaded fastening means.

With these observations and objects in mind, the manner in which the invention achieves its purpose will be appreciated from the following description and the accompanying drawings.

The drawings illustrate several complete examples of the physical embodiment of the invention constructed according to the best modes so far devised for the practical application of the principles thereof, and in which:

FIGURE 1 is a fragmentary view partly in elevation and partly in longitudinal section, of a cylinder incorporating the piston and rod assembly of this invention;

FIGURE 2 is a cross sectional view taken on the line 2—2 in FIGURE 1;

FIGURE 3 is a perspective view, on a reduced scale, of one of the split ring type piston retainers used in the assembly, with its component parts separated;

FIGURE 4 is a perspective view of the split ring retainer of FIGURE 3, with its component parts assembled;

FIGURES 5 through 8 illustrate several modifications of split ring type retainers that can be used in the piston and rod assembly of this invetnion; and FIGURE 9 is a cross sectional view taken on the line 9—9 in FIGURE 8.

Referring now to the accompanying drawings, the numeral 5 designates a piston rod for a hydraulic cylinder 6, only a portion of which has been shown. The piston proper, designated by the numeral 7, is in the nature of an annulus which is confined in the cylinder space 8 between the wall 9 of the cylinder and the exterior of the rod 5 therein. As is conventional in hydraulic cylinder design, the piston 7 can comprise a metal sleeve having a pair of annular V-section sealing members on its periphery as shown; or it can comprise a similar sleeve having conventional piston rings confined in circumferential grooves in its periphery, for engagement with the inner surface of the wall 9.

The actual construction of the piston, however, forms no part of this invention. It is sufficient to consider the piston as an annulus that has sliding and sealing engagement with the wall 9 of the cylinder. Preferably, at least one O-ring seal 10 is confined between the piston and the piston rod, the ring being received in a circumferential groove 11 in one of those parts. As a result, leakage of fluid along both the internal and external cylindrical surfaces of the piston 7 is precluded.

One of the most common expedients heretofore resorted to for holding an annular piston in place upon a piston rod has been to fit the piston on a reduced inner end portion of the rod having screw threads on its extremity, so that the piston could be lengthwise clamped between a nut threaded on the rod extremity and the shoulder formed at the base of the reduced inner end portion of the rod.

According to this invention, the piston 7 is held in a fixed axial position on the rod 5 entirely without screw threaded fastening means and in an exceptionally simple manner that greatly facilitates assembly of the piston to the rod as well as replacement of the piston or the sealing means thereon whenever necessary. Ring like thrust receiving retainers 12 on the piston rod 5 at each end of the piston 7 achieve this purpose.

The retainers 12 shown in FIGURES 1 to 3 comprise integrally connected inner and outer portions 13 and 14, respectively. The inner portions 13 of the retainers are in the nature of radial flanges that engage in grooves 15 in the piston rod outwardly adjacent to each end of the piston 7 thereon. Each such groove 15 defines axially spaced opposing abutments 16 and 17 having surfaces which are transverse to the rod axis, and which abutments embrace the internal flanges 14 on the retainers and hold the latter against axial motion relative to the piston rod.

At this point it should be observed that the piston rod 5 can have a uniform diameter, and that the grooves 15 therein in effect define a land 18 between them upon which the piston 7 is seated. With the construction of the retainers 12 shown in FIGURES 1 to 3, the land 18 has an axial dimension which is equal to or preferably slightly less than the length of the annular piston 7, and while the locations of the abutments 16 are not critical, their opposing abutments 17 face toward and are spaced from the ends of the piston adjacent thereto equal distances such as to cause the outer portions 14 of the retainers 12 to be held as close as possible to and preferably in engagement with the ends of the annular piston 7.

The retainers are circumferentially interrupted to enable them to be assembled to and disassembled from the piston rod by lateral movement relative thereto, whereby the wall 9 of the cylinder can serve as the sole means of retaining the retainers against displacement from the piston rod. One type of circumferentially interrupted retainer suitable for the purposes of this invention is the split ring collar shown best in FIGURES 3 and 4, which is comprised of complementary half ring or semicylindrical collar sections 19. A C-shaped collar (not shown) would also have the circumferential interruption necessary to enable it to be laterally applied to and displaced from a grooved portion of the piston rod.

Split ring collars such as shown, however, are advantageous since they are not only nicely able to transmit axial thrust between the piston 7 and the abutments 17, through the flanges 13 on the inner portions of the collars, but they can also provide the best bearings for the piston rod. While the collars or retainers 12 can be made of a suitable bearing material, each can, instead, be made of steel and have a bearing band 20 snapped into place in a shallow groove 21 in its periphery, as seen in FIGURE 3. The bearing band 20 nearly completely encircles the complementary halves of its collar, and it is, of course, applied thereto after the collar halves are suitably anchored in the groove 15 therefor.

As seen best in FIGURES 2 and 3, the split ring collars can have their internal flanges 13 disposed at the ends of the collars which are to engage the ends of the annular piston 7. The outer portions 14 of the collars are wider so as to provide semicylindrical rims 22 which project axially from their flanged ends, away from the piston, and encircle portions of the piston rod outwardly adjacent to the abutments 17 thereon. The abutments 17, of course, are provided by grooves 15 that extend completely around the periphery of the piston rod.

The diameter of the combination bearing and thrust collars 12 is such that their bearing bands 20 will have sliding engagement with the wall of the cylinder, so that outward radial movement of the complementary collar sections will be held to a minimum, and the cylinder wall will then hold the collar sections against lateral displacement from the rod.

One of the features of the piston and rod assembly described is that the piston 7 can be axially fixed by the retainers 12 on a land 18 that is disposed wherever desired along the length of the piston rod 5. This can be highly advantageous in cases where the rod must project from both ends of its cylinder, and the piston must be axially fixed on the rod medially of its ends. As seen in FIGURE 1, however, the retainers 12 can also hold the piston 7 at the extreme inner end of the rod.

The modified retainers 120 shown in FIGURE 5 differ from those described above only in that the rims 22 on their outer portions 14 project axially toward and into engagement with the opposite ends of the piston 7. In this case, the integral flange like inner portions 13 of the retainers engage in grooves 15 in the rod located a distance outwardly from the ends of the piston, so that the land 18 on which the piston seats is longer than the piston.

FIGURE 6 illustrates how each retainer 220 can comprise an inner portion 130 consisting of complementary ring halves, and a separate outer portion 140 likewise consisting of complementary ring halves having their interiors grooved as at 24 to receive the peripheral portions of the inner ring portions 130. In this case, the inner and outer portions of the retainers are connected together by the engagement of the inner portions 130 in the grooves of the outer portions 140, and the latter hold the inner portions 130 against lateral displacement from the rod grooves 15 except when the assembly is withdrawn from the cylinder.

The embodiment of the invention illustrated in FIGURE 7 shows how one split ring retainer 12 of the type used in FIGURE 1, can cooperate with still another type of retainer 320 to anchor the piston 7 against axial motion on the piston rod 5. The retainer 12 in this case is located adjacent to the inner end of the rod 5, and the retainer 320 is remote therefrom, at the other end of the piston.

The retainer 320 again comprises a split ring inner portion 130 engaged in a groove 15 in the rod spaced a distance from the adjacent end of the piston, and an outer portion 240 in the form of a continuous ring bored to closely fit the rod and having a counterbore 26 opening to its end remote from the piston to receive the inner portion 130 of the retainer. Hence, the solid outer ring 240 is held against the adjacent end of the piston by its connection with the inner portion 130 of the retainer, and it also serves to hold the complementary halves of the inner portion 130 against lateral displacement from the rod groove 15.

The bearing bands 20, of course, can be applied to the outer portions of all of the retainers described.

FIGURES 8 and 9 illustrate still another embodiment of the invention wherein the retainers 420 comprise continuous outer rings 340 with bearing bands 20 on their peripheries, and split ring inner portions 230 received in grooves 150 in the rod and connected to the outer retainer portions by engagement thereof in grooves 28 which open to the bores of the outer rings medially of their ends. In this case, the rod grooves 150 are somewhat deeper than before, allow the inner ring halves 230 to be fully retracted thereinto, from projected positions engaged in the outer ring grooves 28, in order to enable the outer rings to be slid axially off of the rod when the latter is withdrawn from the cylinder.

The inner ring halves 230 are yieldingly biased outwardly to their projected positions by means of radially expansive springs 30 in the form of circumferentially interrupted sinuous bands, as seen best in FIGURE 9. Radial holes 31 in the outer rings provide for insertion of a pin or the like into engagement with the inner ring halves, to enable them to be pushed to retracted positions at which their connections with the outer rings are disrupted, and the latter can be moved axially along the piston rod.

From the foregoing description, together with the accompanying drawings, it will be readily apparent to those skilled in the art that this invention provides an exceptionally simple and low cost self-securing piston and rod assembly for a cylinder in which the assembly is to be reciprocably mounted.

What is claimed as my invention is:
1. A piston and rod assembly for a cylinder, characterized by the following:
 (A) annular means defining a piston which is seated on and encircles the rod and which is adapted for sliding and sealing engagement with the wall of a cylinder for which the assembly is intended;
 (B) the rod having a groove outwardly adjacent to each end of the piston, and each such groove providing an abutment having a surface transverse to the rod axis and facing toward the adjacent end of the piston;
 (C) substantially ring like piston retainers on the rod at each end of the piston to hold the latter against axial motion relative to the rod, each such ring like retainer comprising connected inner and outer portions,
  (1) the inner portion being received in the adjacent rod groove and engaged with its said abutment to be held thereby against axial movement away from the piston,
  (2) said inner portion being circumferentially interrupted to provide for lateral displacement thereof from its groove,
  (3) the outer portion having an end surface contiguous to the adjacent end of the piston, and having a peripheral surface disposed to be contiguous with the wall of a cylinder containing the assembly,
  (4) the connection between said inner and outer retainer portions preventing lateral displacement of the inner portion from its groove except when the assembly is removed from a cylinder for which the assembly is intended,
  (5) and said connection between the inner and outer retainer portions providing for transfer of axial thrust between the piston and said abutment;

(D) a band of bearing material on the peripheries of said piston retainers;

(E) and an annular sealing ring encircling the rod and confined between it and the piston.

2. A piston and rod assembly for a cylinder, characterized by the following:

(A) annular means defining a piston which is seated on and encircles the rod and which is adapted for sliding and sealing engagement with the wall of a cylinder for which the assembly is intended;

(B) the rod having a groove outwardly adjacent to each end of the piston, and each such groove providing an abutment having a surface transverse to the rod axis and facing toward the adjacent end of the piston;

(C) and substantially ring like piston retainers on the rod at each end of the piston to hold the latter against axial motion relative to the rod, each such ring like retainer comprising connected inner and outer portions, (1) the inner portion being received in the adjacent rod groove and engaged with its said abutment to be held thereby against axial movement away from the piston, (2) said iner portion being circumferentially interrupted to provide for lateral displacement thereof from its groove, (3) the outer portion having an end surface contiguous to the adjacent end of the piston, and having a peirpheral surface disposed to be contiguous with the wall of a cylinder containing the assembly, (4) the connection between said inner and outer retainer portions preventing lateral displacement of the inner portion from its groove except when the assembly is removed from a cylinder for which the assembly is intended, (5) said connection between the inner and outer retainer portions providing for transfer of axial thrust between the piston and said abutment, and (6) each of said retainers comprising a split ring having complementary ring halves the outer portions of which have greater axial length than the inner portions and closely embrace a portion of the rod alongside the inner portion.

3. The piston and rod assembly of claim 2, further characterized by means providing bearing surfaces on the peripheries of said wider outer portions.

4. A piston and rod assembly for a cylinder, characterized by the following:

(A) annular means defining a piston which is seated on and encircles the rod and which is adapted for sliding and sealing engagement with the wall of a cylinder for which the assembly is intended;

(B) the rod having a groove outwardly adjacent to each end of the piston, and each such groove providing an abutment having a surface tranverse to the rod axis and facing toward the adjacent end of the piston;

(C) substantially ring like piston retainers on the rod at each end of the piston to hold the latter against axial motion relative to the rod, each such ring like retainer comprising connected inner and outer portions, (1) the inner portion being received in the adjacent rod groove and engaged with its said abutment to be held thereby against axial movement away from the piston, (2) said inner portion being circumferentially interrupted to provide for lateral displacement thereof from its groove, (3) the outer portion having an end surface contiguous to the adjacent end of the piston, and having a peripheral surface disposed to be contiguous with the wall of a cylinder containing the assembly, (4) the connection between said inner and outer retainer portions preventing lateral displacement of the inner portion from its groove except when the assembly is removed from a cylinder for which the assembly is intended, (5) and said connection between the inner and outer retainer portions providing for transfer of axial thrust between the piston and said abutment;

(D) at least one of said piston retainers comprising (1) an inner portion consisting of a split ring having complementary semicylindrical ring halves, (2) and an axially longer outer portion similarly consisting of a split ring having complementary semicylindrical ring halves;

(E) and an internal groove in the outer portion, medially of its axial ends, into which the inner portion projects to be thereby connected with the outer member.

5. The piston and rod assembly of claim 4, further characterized by a band of bearing material encircling each of said piston retainers.

6. A piston and rod assembly for a cylinder, characterized by the following:

(A) annular means defining a piston which is seated on and encircles the rod and which is adapted for sliding and sealing engagement with the wall of a cylinder for which the assembly is intended;

(B) the rod having a groove outwardly adjacent to each end of the piston, and each such groove providing an abutment having a surface transverse to the rod axis and facing toward the adjacent end of the piston;

(C) substantially ring like piston retainers on the rod at each end of the piston to hold the latter against axial motion relative to the rod, each such ring like retainer comprising connected inner and outer portions.

(1) the inner portion being received in the adjacent rod groove and engaged with its said abutment to be held thereby against axial movement away from the piston, (2) said inner portion being circumferentially interrupted to provide for lateral displacement thereof from its groove, (3) the outer portion having an end surface contiguous to the adjacent end of the piston, and having a peripheral surface disposed to be contiguous with the wall of a cylinder containing the assembly, (4) the connection betweeen said inner and outer retainer portions preventing lateral displacement of the inner portion from its groove except when the assembly is removed from a cylinder for which the assembly is intended, (5) and said connection between the inner and outer retainer portions providing for transfer of axial thrust between the piston and said abutment;

(D) at least one of said piston retainers comprising a split ring engaged in one of said grooves;

(E) and a continuous collar encircling the rod and confined between said split ring and the adjacent end of the piston, said collar having a counterbore in which the split ring is engaged to be held by the collar against lateral displacement from the rod.

7. A piston and rod assembly for a cylinder, characterized by the following:

(A) annular means defining a piston which is seated on and encircles the rod and which is adapted for sliding and sealing engagement with the wall of a cylinder for which the assembly is intended;

(B) the rod having a groove outwardly adjacent to each end of the piston, and each such groove providing an abutment having a surface transverse to the rod axis and facing toward the adjacent end of the piston;

(C) substantially ring like piston retainers on the rod at each end of the piston to hold the latter against axial motion relative to the rod, each such ring like retainer comprising connected inner and outer portions,
   (1) the inner portion being received in the adjacent rod groove and engaged with its said abutment to be held thereby against axial movement away from the piston,
   (2) said inner portion being circumferentially interrupted to provide for lateral displacement thereof from its groove,
   (3) the outer portion having an end surface contiguous to the adjacent end of the piston, and having a peripheral surface disposed to be contiguous with the wall of a cylinder containing the assembly,
   (4) the connection between said inner and outer retainer portions preventing lateral displacement of the inner portion from its groove except when the assembly is removed from a cylinder for which the assembly is intended,
   (5) and said connection between the inner and outer retainer portions providing for transfer of axial thrust between the piston and said abutment;

(D) one of said rod grooves extending circumferentially around the rod;

(E) and one of said piston retainers comprising
   (1) an outer portion which is provided by a continuous ring wide enough to encircle portions of the rod at each side of said rod groove, and having an internal groove registering with said rod groove;
   (2) an inner portion which is provided by a split ring having complementary semicylindrical ring halves which are movable in opposite radial directions in the rod groove from operative positions partly engaged in both of said registering grooves to inoperative positions wholly within said rod groove;
   (3) biasing means disposed in said rod groove and acting upon said ring halves to yieldingly hold the same in their operative positions;
   (4) and substantially radial holes in said continuous outer ring providing access to the split ring halves to enable them to be depressed to their inoperative positions.

References Cited

UNITED STATES PATENTS

| | | | |
|---|---|---|---|
| 1,301,571 | 4/1919 | Kern | 92—193 X |
| 3,066,001 | 11/1962 | Zimmerman | 92—244 X |
| 3,165,032 | 1/1965 | Konkle | 92—256 X |
| 3,175,474 | 3/1965 | Eickmann | 92—244 X |

CARROLL B. DORITY, Jr., Primary Examiner

U.S. Cl. X.R.

92—256, 257